(12) United States Patent
Müller et al.

(10) Patent No.: US 11,073,530 B2
(45) Date of Patent: Jul. 27, 2021

(54) SAMPLE DISTRIBUTION SYSTEM AND METHOD FOR DISTRIBUTING SAMPLES

(71) Applicant: Integra Biosciences AG, Zizers (CH)

(72) Inventors: Garry Müller, Haldenstein (CH); Andreas Städler, Felsberg (CH)

(73) Assignee: Integra Biosciences AG, Zizers (CH)

( * ) Notice: Subject to any disclaimer, the term of this patent is extended or adjusted under 35 U.S.C. 154(b) by 355 days.

(21) Appl. No.: 16/225,232

(22) Filed: Dec. 19, 2018

(65) Prior Publication Data
US 2019/0195906 A1 Jun. 27, 2019

(30) Foreign Application Priority Data
Dec. 21, 2017 (CH) .................................... 01583/17

(51) Int. Cl.
*G01N 35/10* (2006.01)
*B01L 3/02* (2006.01)
*G01N 21/552* (2014.01)

(52) U.S. Cl.
CPC ........ *G01N 35/1065* (2013.01); *B01L 3/0237* (2013.01); *B01L 3/0275* (2013.01); *G01N 21/553* (2013.01); *G01N 35/109* (2013.01); *B01L 2200/143* (2013.01)

(58) Field of Classification Search
CPC ............. G01N 35/1065; G01N 21/553; G01N 35/109; G01N 35/00584; G01N 35/10; G01N 2035/00772; B01L 3/0275; B01L 3/0237; B01L 2200/143; B01L 3/0213
See application file for complete search history.

(56) References Cited

U.S. PATENT DOCUMENTS

| | | |
|---|---|---|
| 3,588,480 A | 6/1971 | Unger |
| 4,616,514 A | 10/1986 | Magnussen et al. |
| 5,343,769 A | 9/1994 | Suovaniemi et al. |
| 5,415,060 A | 5/1995 | DeStefano |
| 6,778,917 B1 | 8/2004 | Jansen |

(Continued)

FOREIGN PATENT DOCUMENTS

| | | |
|---|---|---|
| DE | 10 2008 010 267 | 8/2009 |
| EP | 0114686 | 8/1984 |

(Continued)

OTHER PUBLICATIONS

European Search Report dated Apr. 3, 2019 in co-pending European Patent Application 18 21 5662.

*Primary Examiner* — Samuel P Siefke
*Assistant Examiner* — Henry H Nguyen
(74) *Attorney, Agent, or Firm* — Andrus Intellectual Property Law

(57) ABSTRACT

A sample distribution system 1 has a regulator 4 for receiving a pipetting unit 2 that has at least one exchangeable pipette tip 3, wherein the regulator 4 is configured to change the position of the pipetting unit 2 in relation to a base plate 5, and to detect the presence or absence of pipette tips 3 with a sensor unit 12.
According to the invention, the sensor unit 12 is a photoelectric sensor, in particular a reflection photoelectric sensor, with a detection range. The sensor unit 12 and the pipetting unit 2 can also move in relation to one another, in order to determine the presence of a pipette tip 3, if the pipette tip is in the detection range of the sensor unit 12.

13 Claims, 2 Drawing Sheets

(56) References Cited

U.S. PATENT DOCUMENTS

| | | | |
|---|---|---|---|
| 7,618,589 B2 * | 11/2009 | Toi | G01N 35/1011 422/50 |
| 2003/0152493 A1 | 8/2003 | Lefebvre | |
| 2005/0118069 A1 | 6/2005 | Solotareff et al. | |
| 2005/0155438 A1 | 7/2005 | Belgardt | |
| 2008/0286157 A1 | 11/2008 | Mathus et al. | |
| 2009/0274587 A1 | 11/2009 | Butz et al. | |
| 2011/0109907 A1 * | 5/2011 | Meyers | G01N 21/552 356/445 |
| 2011/0132110 A1 | 6/2011 | Kimura et al. | |
| 2011/0209564 A1 | 9/2011 | Von Beichmann et al. | |
| 2011/0268627 A1 | 11/2011 | Warhurst et al. | |
| 2011/0296931 A1 | 12/2011 | Warhurst | |
| 2012/0018925 A1 | 1/2012 | Schmidt | |
| 2014/0047931 A1 | 2/2014 | Mettler et al. | |
| 2014/0147349 A1 | 5/2014 | Schmidt | |
| 2014/0199216 A1 | 7/2014 | Moriarty et al. | |
| 2014/0260696 A1 * | 9/2014 | Criswell | B01L 3/021 73/864.01 |
| 2015/0093834 A1 * | 4/2015 | Knecht | G01N 35/1002 436/43 |
| 2016/0303557 A1 | 10/2016 | LaCroix | |
| 2017/0189899 A1 * | 7/2017 | Gupta | B01L 3/02 |
| 2017/0197205 A1 | 7/2017 | Fetz et al. | |

FOREIGN PATENT DOCUMENTS

| | | | |
|---|---|---|---|
| EP | 0 864 364 | 9/1998 | |
| GB | 2147996 | 5/1985 | |
| WO | 9117445 | 11/1991 | |
| WO | 0216036 | 2/2002 | |
| WO | 2012 069925 | 5/2012 | |
| WO | WO-2013049706 A1 * | 4/2013 | B01L 3/50853 |

* cited by examiner

SAMPLE DISTRIBUTION SYSTEM AND METHOD FOR DISTRIBUTING SAMPLES

FIELD OF THE INVENTION

The invention relates to a sample distribution system using a sensor unit to detect e.g. the presence or absence of pipette tips.

BACKGROUND OF THE INVENTION

Sample distribution systems are known from the prior art and typically used in laboratories. These sample distribution systems usually work with pipettes used for dosing fluids. There are automatic pipette systems and handheld and/or manual pipettes. All of these devices have a sample container in which liquid samples are usually received, and from which these can be dispensed.

Samples can be received and dispensed, for example, in that a vacuum is generated in the sample container for receiving a sample, and a pressure is generated for dispensing the sample. Piston stroke pipettes have a moving piston for this, in which an air column is located between the sample and the piston. When the piston moves in a first direction, the piston compresses the air column, and when the piston moves in the other direction, the air column is expanded, and the sample is drawn into the sample container.

In order to prevent contamination, pipettes can be equipped with exchangeable containers in the form of pipette tips. The pipette then has a connecting section onto which the pipette tips are attached, and from which they can be removed after use. The pipette tips normally have two openings, wherein the connecting section is received in the larger opening and forms a seal. Samples are received and dispensed through the smaller opening. Because only the pipette tip comes in contact with the sample, contamination is prevented in subsequent pipetting procedures. The pipette tips are normally disposable plastic tips.

In addition to the purely mechanical pipettes, there are also pipettes that are controlled electronically. Furthermore, the pipettes can have one (in single channel pipettes) or more (in multichannel pipettes) connecting sections. With numerous connecting sections, each of which can be provided with an exchangeable pipette tip, it is possible to simultaneously receive and dispense numerous samples. The disposal mechanisms used therewith normally have a few similarities. These include a slider that can move along the connecting section. When the disposal mechanism is operated, the slider is moved toward the pipette tip, comes in contact therewith, and pushes it off the connecting section. The disposal mechanism can usually be operated manually, using an operating element. There are also automatic disposal mechanisms, which are operated with electric or pneumatic drives. In any case, a force is mechanically applied to the slider, causing it to move toward the pipette tip. The part of the disposal mechanism that produces the connection between the operating element or drive and the slider may have different designs, but in general has one or more moving links. The movement of the links is coupled to the movement of the slider. For practical purposes, the links are designed to transfer a force exerted when the operating element is operated, or the force exerted on the slider by the drive.

In particular with automatic sample distribution systems, e.g. pipetting robots with automatic disposal mechanisms for the pipette tips, the disposal is monitored by special, mechanical sensors in the region of the connecting section. There is normally a slider and a sensor located in the region of the connecting section between the pipetting unit and the pipette tip, by means of which the presence of a pipette tip is detected. Therefore, a dedicated detecting unit for monitoring the disposal is necessary for each pipette tip. Furthermore, one of the common problems associated with disposing of the pipette tips is that, although they are released from the connecting section, they are not fully detached because of static electricity. When the pipettes remain attached thereto, this is not detected by known mechanical sensors. The correct disposal of the pipette tips, and thus the correct monitoring of this process is generally a critical function for the pipetting. If contaminated pipette tips come in contact with the samples, all previous samples or results must be regarded as invalid.

The object of the present invention is therefore to create an improved sample distribution system and an improved method for distributing samples. In doing so, the disposal mechanism is to be improved such that the proper disposal of the pipette tips can be reliably monitored, and errors in disposal can accordingly be reliably detected.

This problem is solved by a sample distribution system and method described below.

SUMMARY OF THE INVENTION

The sample distribution system according to the invention has a sample distribution system for this that has a regulator for receiving a pipetting unit with at least one exchangeable pipette tip, wherein the regulator is designed to adjust the position of the pipetting unit with respect to a base plate, and has a sensor unit configured to detect the absence of pipette tips, wherein the sensor unit is a photoelectric sensor with a specific detection range. The photoelectric sensor can be a reflection photoelectric sensor in particular, i.e. the sensor unit comprises at least one transmitter for transmitting a light beam or light pulse, and a receiver for receiving the light beam or light pulse that is reflected back, wherein the transmitter transmits the light beam or light pulse toward a reflector element, which then reflects the light beam or light pulse back to the receiver.

The problem is also solved with a method for distributing samples that comprises the following steps:
 a) placing pipette tips on a pipetting unit,
 b) executing at least one pipetting procedure,
 c) moving the pipetting unit into the detection range of the sensor unit,
 d) moving the pipetting unit in relation to the sensor unit in order to check whether there is a pipette tip in the detection range of the sensor unit.

A pipetting procedure involves receiving a liquid in pipettes, and distributing, or dispensing the liquid into sample containers, normally comprising numerous small wells.

The sample distribution system according to the invention, and the method according to the invention basically allow the pipetting unit to be viewed from outside, such that it can be advantageously determined whether or not a pipette tip has been correctly disposed of. It is also possible to monitor whether a pipette tip is absent, or whether all of the pipette tips are present, i.e. whether all of the pipette tips have been received from a container that contains a supply of pipette tips. Furthermore, the shape and position of the pipette tips can be checked, in particular in relation to the pipetting unit.

In a first embodiment of the invention, the sensor unit and the pipetting unit can move in relation to one another, in order to determine whether a pipette tip is present when it is in the detection range of the sensor unit.

The sensor unit can have a dedicated counter for determining the number of pipette tips. The detection range of the sensor unit is formed in the simplest case by a single light beam or light pulse. It is also possible to use photoelectric sensors in the form of light grids that have numerous light beams for the detection. It should be noted that the individual pipette tips are scanned with the light beam, i.e. the light beam moves in relation to the pipette tips. If, for example, the light beam strikes a pipette tip, the beam is not reflected back, and the sensor detects a dark area. The number of pipette tips that are present can therefore be determined by the number of dark areas. A precise evaluation is obtained in the known manner by means of appropriate algorithms.

In another embodiment, the sensor can pivot from a starting position to an end position, in order to pivot the detection range about the Z-axis. Alternatively, the sensor unit can be constructed such that the main direction of the detection range forms an acute angle with the direction of movement of the regulator along the X-axis.

The sensor unit can be constructed such that it remains stationary in relation to the base plate and thus the containers in or on the sample distribution system.

In one embodiment of the invention, the sensor unit has a laser diode for emitting light pulses or light beams, and a lens located in front of the laser diode, wherein the light pulse or light beam has a beam diameter that is smaller than the width of the smallest pipette tip at its narrowest point. The beam diameter therefore defines the obtainable resolution of the sensor unit and must be selected in accordance with the size of the object that is to be detected—the pipette tip.

The pipette tips are preferably not detected in the region of the connecting section, but instead, it is intended that the narrow or pointed region of the pipette tip—thus with the region that has the small opening in the pipette tip—is detected when it enters the detection range. In order to be able to detect the narrowest possible pipette tips, it is advantageous to use a light beam that has the smallest possible beam diameter.

The sensor unit can be configured such that it interacts with a reflector element located on the rim of a least one of the containers, and emits light beams or light pulses toward this reflector element. The reflector element can be formed directly on the container for this, or it can be mounted on a separate retainer.

The sensor unit is preferably located in the detection range above the openings of the containers. In order to be able to monitor the pipette tips on the pipetting unit at all times, each container or group of containers can have a dedicated detection range.

In particular in order to be able to detect the correct disposal of the pipette tips, the detection range is directly above a container forming a disposal box, in which the used pipette tips are disposed of.

The sensor unit can be connected to the base plate via a mast-like carrier element, incorporated in the regulator or attached to the regulator.

In an advantageous further development of the invention, the sensor unit can be configured to also monitor the exceeding of a maximum acceptable filling state of the disposal box in particular. The pipette tips are discarded in this disposal box, i.e. the pipette tips fall into this box after disposal thereof. It is also entirely possible for the pipette tips to become entangled—even if the maximum filling capacity of the box has not been reached—and extend over the edge of the box. These protruding pipette tips are in the region of the travel path of the regulator, including the pipetting unit, such that discarded, entangled pipette tips could collide with the pipette tips placed on the pipetting unit. This could result in contamination of the samples, or at least a displacement of the pipette tips that have been placed on the pipetting unit, thus changing the orientation of the pipette tips. Incorrectly aligned pipette tips are critical because they can no longer dispense the samples correctly into the sample wells in a sample container, because they are not positioned precisely over the corresponding sample well during the dispensing of the sample.

In a further development of the invention, the sensor unit therefore has a dedicated evaluation unit that can determine the position and orientation of the pipette tips in relation to the pipetting unit. For this, the detection of the pipette tips should always take place at the exact same location. If the sensor unit is pivoted, a pipette tip for a specific channel sitting correctly on the pipetting unit is always precisely detected when the sensor unit is in the same position. If the expected pipette tip is detected earlier or later, it can be concluded that the pipette tip is not correctly placed on the pipetting unit, and countermeasures may be carried out, e.g. stopping the pipetting procedure, and outputting a error message. Consequently, knowledge of the pivotal position of the sensor unit and knowledge of the position of the pipetting unit during the detection procedure may be sufficient for assessing the correct position of a pipette tip on the pipetting unit by means of a preferably programmable evaluation unit. By way of example, the assessment of whether the shape, position, and orientation of a pipette tip is correct can take place by means of a runtime measurement. Thus, not only is the number of light and dark areas evaluated, but the duration of the light and dark areas is also measured and can be compared with a reference for evaluating the signal curve.

If the sensor unit is constructed such that the main direction of the detection range forms an acute angle with the direction of movement of the regulator along the X-axis, as an alternative to pivoting, it is likewise possible to detect incorrectly seated pipette tips using an evaluation unit. During the detection process, the precise knowledge of the position of the regulator in reference to the X-axis is sufficient. If, specifically, no pipette tip is detected at a predefined position, but is detected earlier or later, it can likewise be concluded that the pipette tip is not correctly placed on the pipetting unit.

Defective pipette tips that have become deformed can also be detected in the same manner that an incorrectly placed pipette tip can be detected.

In another further development, the sensor unit can be configured to monitor the minimum clearance height of the pipetting unit over at least one of the containers, and in another further development of the method according to the invention, the minimum clearance height of the pipetting unit over at least one of the containers can be monitored. The monitoring of the clearance height is advantageous, because the necessarily present sensor unit can assume another additional monitoring function. As a result, collisions between the pipetting unit and containers can be safely avoided. Furthermore, it is possible to limit the clearance height to a minimum, i.e. depending on whether pipette tips have been attached to the pipetting unit or not, the pipetting unit can be moved at a greater or lesser height over the containers. It is thus possible to optimize the travel path of the pipetting unit such that the shortest possible travel path can be implemented with the greatest safety. This saves time for the individual pipetting procedures, which, in the case of numerous pipetting procedures that must be carried out in a test, results in a large and clearly noticeable efficiency.

Furthermore, each container can have a separate dedicated sensor unit. As a result, it is possible to optimize the clearance height, because the containers may be of different heights, thus requiring a separate monitoring for each container in order to obtain the minimum clearance height.

The pipetting unit can be structurally united to the regulator in another embodiment of the invention. The pipetting unit is integrated in a carrier arm of the regulator in this embodiment.

In another development of the method according to the invention, it is checked in a first step whether all of the pipette tips are connected to the pipetting unit, and in a second step it is checked whether all of the pipette tips have been discarded, wherein the pipette tips are discarded between the two checking steps.

In another further development of the method, the following steps are carried out during the first and second checking steps:
  a) setting a counter to zero,
  b) activation of the sensor unit by emitting a light beam or light pulse, wherein the main direction of the detection range forms an acute angle with the direction of movement for the pipetting unit,
  c) moving the pipetting unit until a pipette tip enters the detection range, and the associated interruption of the light beam or light pulse is detected,
  d) increasing the number of detected pipette tips by one,
  e) repeating the steps starting at b).

In another alternative further development of the method according to the invention, the following method steps are carried out during the first or second checking steps:
  a) setting a counter to zero,
  b) activation of the sensor unit by emitting a light beam or light pulse, wherein the main direction of the detection range forms an acute angle with the direction of movement for the pipetting unit,
  c) moving the pipetting unit until a pipette tip enters the detection range, and the associated interruption of the light beam or light pulse is detected,
  d) increasing the number of detected pipette tips by one,
  e) repeating the steps starting at b).

Alternatively, the counting can also take place in that, first, a signal sequence of light and dark areas is determined, and this signal sequence is then evaluated, wherein the number of dark areas corresponds to the number of pipette tips. Accordingly, the method according to the invention can be carried out as an alternative to that above in that only the method steps b) and c) are carried out, in order to obtain a signal sequence of light and dark areas, and the signal sequence is then evaluated in order to determine the number of pipette tips from the number of dark areas.

In another advantageous further development of the invention, the following method steps can be carried out during the first or second checking steps:
  a) reading the number of detected pipette tips from the counter,
  b) comparing the number of detected pipette tips with a set number of pipette tips,
  c) starting a new pipetting cycle when the counter corresponds to the number of pipette tips,
  d) outputting an error message if the counter does not indicate the correct number of pipette tips.

In another embodiment of the invention, the checking steps are carried out by means of a sensor unit in the form of a photoelectric sensor. The sensor unit can emit light beams or light pulses toward a reflector element during the checking steps, wherein the light beams or light pulses are reflected back to the sensor unit at the reflector element if no pipette tips are present in the beam path of the light beam or light pulse.

If it has been determined in the first checking step that not all of the pipette tips are present, the entire pipetting procedure can be stopped and a corresponding error message is output. It may also be determined in the second checking step that not all of the pipette tips have been disposed of. In this case, the entire pipetting procedure is also stopped, and a corresponding error message is output.

If the pipette tips that were not ejected are removed manually, the pipetting procedure can be continued. This advantageously takes place in particular when the removal of the pipette tips that were not ejected is accounted for through an input on a control element of the sample distribution system.

In a further development of the method for distributing samples according to the invention, the sensor unit can monitor the filling state of the disposal box with discarded pipette tips.

Further advantages and features of the invention can be derived from the following description of exemplary embodiments of the invention with reference to the schematic illustrations.

BRIEF DESCRIPTION OF THE DRAWINGS

Therein, not to scale.

DETAILED DESCRIPTION

Figure 1:
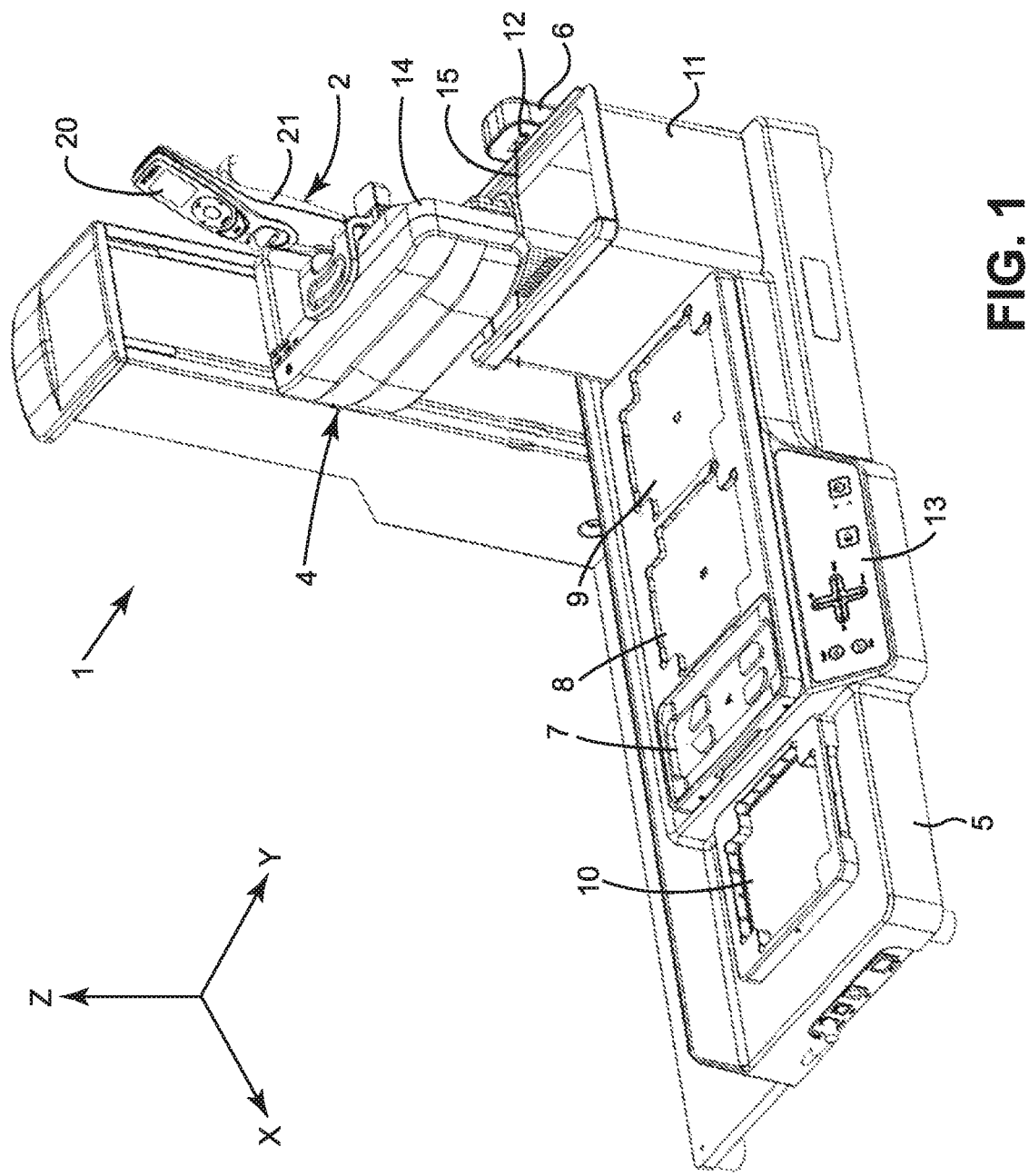
FIG. 1 shows a first perspective view of a sample distribution system according to the invention.
Figure 2:
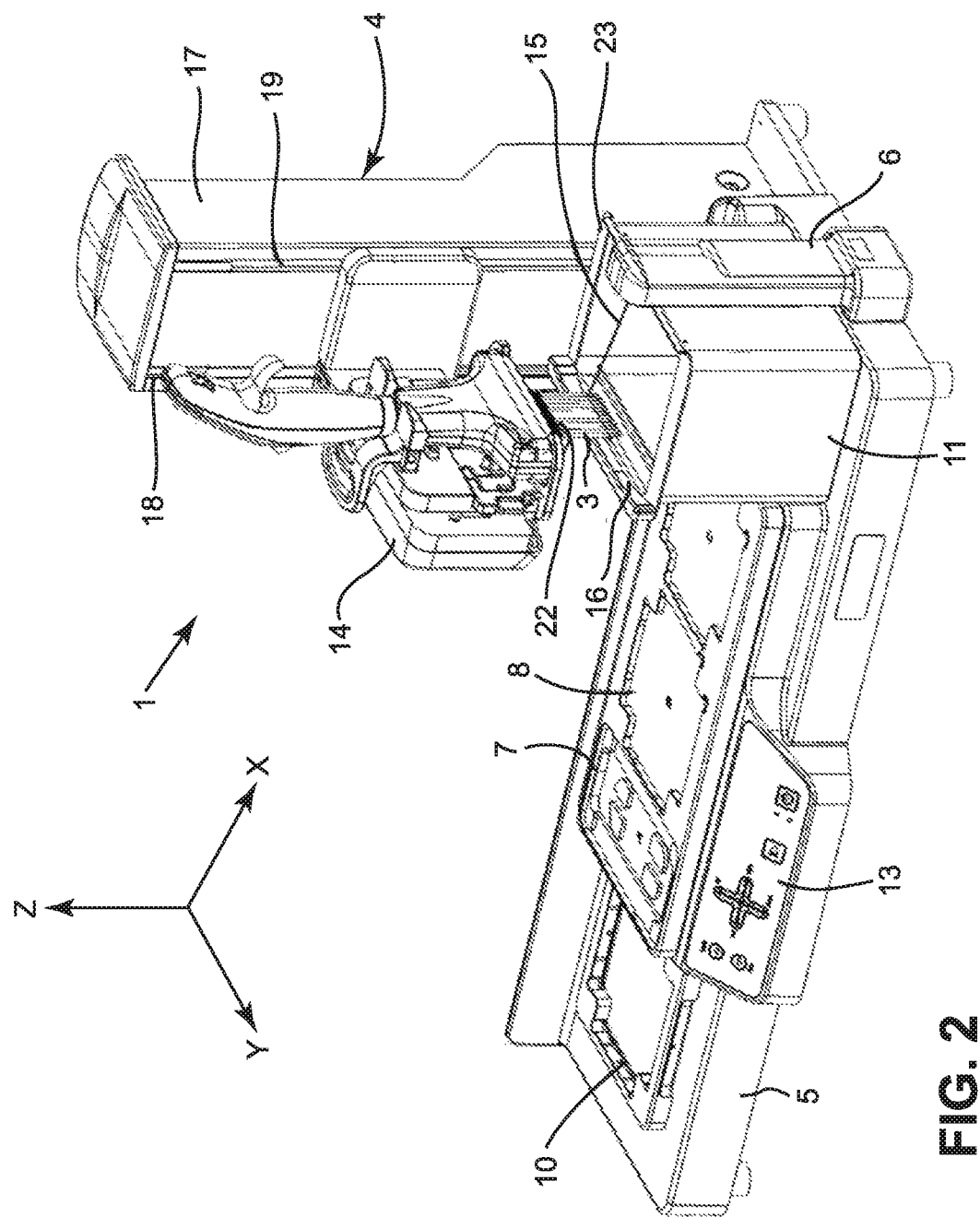
FIG. 2 shows a second perspective view of the sample distribution system according to the invention shown in FIG. 1.

An exemplary embodiment of a sample distribution system 1 is shown in FIGS. 1 and 2 from different perspectives. The substantial components thereof are a regulator 4 and a base plate 5. The regulator 4 has an L-shaped carrier arm 14 for receiving a pipetting unit 2. The pipetting unit 2 is a multi-channel pipette that can accommodate a total of 12 pipette tips 3 in the embodiment shown therein. Furthermore, the regulator 4 has a mast-like guide arm 17 with guide slots 18, 19. The carrier arm 14 can be raised or lowered in relation to the sample containers, not shown therein. In other words, a movement clearance is created by the guide slots 18, 19 of the regulator 4 in conjunction with the carrier arm 14 that runs parallel to the Z-axis. It is also possible to move the regulator 4 on a sliding surface on the base plate 5 along the X-axis. The regulator 4 is guided thereby in a recess, not visible in FIG. 1. The regulator consequently allows the pipetting unit 2 to be raised or lowered with a drive unit (not shown in the figures) that is preferably incorporated in the guide arm 17, such that it can be moved back and forth. As a result, it is possible to change the relative position of the pipetting unit 2 to the containers, not shown, as well as the disposal box 11.

It is possible to program a pipetting procedure with numerous operating cycles via a user interface 13, located at the front of the base plate 5. It is also possible to carry out this programming in the exemplary embodiments shown in FIGS. 1 and 2 on a control element 20 located on a handle 21 of the pipetting unit 2. The base plate 5 also forms the base for receiving the different containers. The containers as such are not shown, but the spaces 7, 8, 9, and 10 for these can be distinguished. The containers needed for a test are placed therein. The spaces 8, 9, and 10 accommodate, in particular, receiving or target containers for samples or fluids, and space 7 is normally used for a pipette tip supply container. Unused pipette tips 3 can be automatically removed from this pipette tip supply container in a known manner, and mounted on the pipetting unit 2. For this, the pipetting unit 2 is placed by the regulator 4 above the space 7, or the pipette tip supply container, not shown, and subsequently lowered until the free ends of the pipette tips 3 engage with the tip fittings 22 on the pipetting unit. The pipette tips 3 are thus connected to the pipetting unit 2 via the tip fittings 22, and can be used for aspirating a sample or fluid from a source container and for the subsequent distribution of the samples or fluids into target containers.

At the end of a pipetting procedure, the regulator 4 moves the pipetting unit into position above the disposal box 11. The contaminated pipette tips 3 are pulled off the tip fittings 22 and fall into the disposal box.

This procedure is monitored by a sensor unit 12. This sensor unit 12 is located on a mast-like carrier arm 6 and is pivotally mounted thereon. The pivotal movement is oriented such that the detection range of the sensor unit 12 formed by a light beam 15 can be pivoted in the plane spanning the X-axis and the Y-axis. The pivotal range is ca. ±40° with respect to the center position of the sensor unit 12. The detection range is parallel to the X-axis when the sensor unit 12 is in this center position. It can thus be derived directly from FIG. 2 that when the sensor unit 12 is pivoted from a starting position at −40° to an end position at +40°, it has passed over all of the pipette tips 3. Seen from the direction of the beam emitted by the sensor unit 12, a reflector element 16 is located behind the pipette tips on the rim 23 of the disposal box 11, which reflects the light beam 15 from the sensor unit 12 back to a receiver in the sensor unit. If there is a pipette tip 3 in the beam path of the light beam 15, the light beam 15 cannot reach the reflector element 16, it is not reflected, and the receiver registers the absence or interruption of the light beam 15. It can then be concluded on the basis of the interruption of the light beam 15 that a pipette tip is present. Consequently, if a counter is activated during the pivoting of the sensor unit that records this interruption, the number of pipette tips that are present can be determined after completing the pivotal movement. If the number of pipette tips 3 that can be received by the pipetting unit 2 is defined in the programming of the pipetting procedure, it can be determined whether or not there is an error by comparing the detected number of pipette tips with the stored number. Alternatively, the pipetting unit itself can provide data regarding how many pipetting channels it has. The number of existing pipetting channels corresponds in this case to the number of pipetting tips 3 that are used.

Alternatively, the sensor unit 12 can also be placed with the mast-like carrier element 6 at the narrow end of the disposal box. Accordingly, a reflector element 16 is then attached to the opposite narrow side of the disposal box. In this case, it makes little sense to pivot the sensor unit, because the individual pipette tips more or less block one another from the perspective of the sensor unit, and thus cannot be clearly detected. Instead, it is necessary here that the emission direction of the light beam 15, or the main direction of the detection range, is oriented such that this emission direction is at an acute angle to the X-axis. As a result, the light beam runs at an angle, or diagonally, over the opening of the disposal box. In order to then detect the individual pipette tips, the pipetting unit must be moved along the X-axis. Consequently, the pipette tips enter the detection range successively, and can be detected sequentially. This alternative is not shown in the figures.

Another alternative embodiment that is not shown can be selected for the mast-like carrier element 6. It is conceivable that the carrier element 6 can be adjusted in terms of its height, in order to adjust the detection range of the sensor unit directly to the height of the containers. For this, the carrier element can have a telescoping design.

The illustrated exemplary embodiments of the invention comprise a pipetting unit 2 in the form of a pipetting module connected to the carrier arm 14 via a releasable interlocking system. As a result, it is possible to remove the pipetting unit 2 from the sample distribution system 1, and use it as a manual pipette. For clarification, it should be noted that the concept of the invention can also be used in sample distribution systems in which a pipetting unit is permanently attached to the carrier arm, or in which the pipetting unit is structurally united with the carrier arm.

Although the invention has been described above in reference to specific embodiments, it is clear that changes, modifications, variations, and combinations can be made without abandoning the inventive concept.

LIST OF REFERENCE SYMBOLS 1 sample distribution system
2 pipetting unit
3 pipette tip
4 regulator
5 base plate
6 mast-like carrier element
7 space for a supply container of pipette tips
8, 9, 10 spaces for receiving or target containers
11 disposal box
12 sensor unit
13 control panel
14 carrier arm
15 light beam or light pulse
16 reflector element
17 guide arm
18, 19 guide slots
20 control element
21 handle
22 connecting section
23 rim

The invention claimed is:

1. A sample distribution system (1) that has a regulator (4) for receiving a multi-channel pipetting unit (2) with multiple exchangeable pipette tips (3) aligned in a row along a Y-axis direction perpendicular to an X-axis direction when the multi-channel pipetting unit is received in the regulator, wherein the regulator (4) is configured to change the position of the multi-channel pipetting unit (2) with respect to a base plate (5) along the X-axis direction and can also change the position of the multi-channel pipetting unit (2) in a Z-axis direction which is also perpendicular to the X-axis direction, wherein the sample distribution system also comprises:

a sensor unit (12) comprising a reflector element, a transmitter for transmitting a light beam or pulse towards the reflector element, and a receiver for detecting a reflected light beam or pulse, wherein the sensor unit is configured to detect a presence or absence of each of the multiple pipette tips (3) on the multi-channel pipetting unit when the regulator (4) moves the multi-channel pipetting unit to a position within a detection range of the sensor unit, the reflector element extends in the Y-axis direction such that the reflector element is on an opposite side of the multiple pipette tips on the multi-channel pipetting unit as the transmitter and the receiver when the multi-channel pipetting unit has been moved to the position within the detection range of the sensor unit, and the transmitter and the receiver are mounted in a fixed location relative to the base plate and configured to pivot about a Z-axis in order to scan for the presence or absence of each of the multiple pipette tips on the multi-channel pipetting unit from a starting position to an end position along the Y-axis when the multi-channel pipetting unit has been moved to the position within the detection range.

2. The sample distribution system according to claim 1 wherein the transmitter of the sensor unit (12) comprises a laser diode for emitting light pulses or light beams (15) and a lens located in front of the laser diode; the light pulses or the light beams (15) has a beam diameter that is smaller than the width of the pipette tips at the pipette tips'.

3. The sample distribution system according to claim 1 wherein the reflector element (16) is located on a rim (23) of at least one container.

4. The sample distribution system according to claim 1 wherein the sensor unit (12) has a dedicated counter for determining the number of pipette tips (3).

5. The sample distribution system according to claim 1 wherein the sensor unit (12) is disposed such that the detection range is located above openings of a container located on the base plate.

6. The sample distribution system according to claim 5 wherein the container has a dedicated detection range.

7. The sample distribution system according to claim 1 wherein the detection range lies above a container forming a disposal box (11) in which the used pipette tips (3) are discarded, wherein said container is located on the base plate.

8. The sample distribution system according to claim 7 wherein the sensor unit (12) is configured to monitor a filling state with discarded pipette tips (3) in the container forming a disposal box (11).

9. The sample distribution system according to claim 1 wherein the sensor unit (12) is connected to the base plate (5) via a carrier element (6).

10. The sample distribution system according to claim 1 wherein the sensor unit (12) is further configured to monitor a minimum clearance height of the multi-channel pipetting unit (2) over one or more containers.

11. The sample distribution system according to claim 1 wherein the system can accommodate multiple containers and each container has a separate dedicated sensor unit (12).

12. The sample distribution system according to claim 1 wherein the pipetting unit (2) is structurally united multi-channel with the regulator (4).

13. The sample distribution system according to claim 1 wherein the sensor unit (12) has a dedicated evaluation unit comprising a programmable processor that assesses the position and orientation of the pipette tips (3) in relation to the pipetting unit (2) and the shape of the pipette tips (3).

* * * * *